(12) United States Patent
Kelley et al.

(10) Patent No.: US 7,931,822 B2
(45) Date of Patent: Apr. 26, 2011

(54) COMPOSITIONS AND METHODS FOR WASTEWATER TREATMENT

(75) Inventors: Douglas G. Kelley, Wenatchee, WA (US); Richard A. Handley, Loon Lake, WA (US)

(73) Assignee: Inland Environmental Resources, Inc., Pasco, WA (US)

( * ) Notice: Subject to any disclaimer, the term of this patent is extended or adjusted under 35 U.S.C. 154(b) by 545 days.

(21) Appl. No.: 11/681,128

(22) Filed: Mar. 1, 2007

(65) Prior Publication Data

US 2007/0256982 A1 Nov. 8, 2007

Related U.S. Application Data

(60) Provisional application No. 60/863,927, filed on Nov. 1, 2006, provisional application No. 60/863,299, filed on Oct. 27, 2006, provisional application No. 60/779,002, filed on Mar. 3, 2006.

(51) Int. Cl.
*C02F 1/52* (2006.01)
*C02F 1/66* (2006.01)

(52) U.S. Cl. ........ 252/175; 210/716; 210/724; 210/728; 252/181

(58) Field of Classification Search .................. 252/175
See application file for complete search history.

(56) References Cited

U.S. PATENT DOCUMENTS

| | | | |
|---|---|---|---|
| 3,692,898 A | 9/1972 | Gorman et al. | |
| 3,957,674 A | 5/1976 | Sano et al. | |
| 3,963,637 A * | 6/1976 | Chappell | 252/181 |
| 4,412,844 A | 11/1983 | Collins et al. | |
| 4,415,467 A * | 11/1983 | Piepho | 252/181 |
| 4,430,248 A | 2/1984 | Rey | |
| 4,566,986 A * | 1/1986 | Waldmann | 252/175 |
| 4,743,396 A | 5/1988 | Fong et al. | |
| 4,877,524 A * | 10/1989 | Eberhardt | 210/242.1 |
| 5,076,846 A | 12/1991 | Buri et al. | |
| 5,514,357 A | 5/1996 | Richmond et al. | |
| 5,824,279 A | 10/1998 | Richmond et al. | |
| 5,877,247 A | 3/1999 | Mahar | |
| 5,906,804 A | 5/1999 | Aral et al. | |
| 6,203,722 B1 * | 3/2001 | Hurst | 252/192 |
| 6,267,812 B1 | 7/2001 | Lefer et al. | |
| 6,383,398 B2 * | 5/2002 | Amer | 210/710 |
| 6,589,427 B2 * | 7/2003 | Moghe et al. | 210/667 |
| 6,929,759 B2 * | 8/2005 | Fruh et al. | 252/181 |
| 7,108,792 B2 * | 9/2006 | Wegner | 210/725 |
| 7,445,718 B2 * | 11/2008 | Misra et al. | 210/714 |
| 2003/0213753 A1 * | 11/2003 | Landis et al. | 210/723 |

* cited by examiner

*Primary Examiner* — Peter A Hruskoci
(74) *Attorney, Agent, or Firm* — Black Lowe & Graham PLLC

(57) ABSTRACT

Methods and compositions utilizing aluminum, magnesium, and calcium-based additives for the treatment and neutralization of wastewater are described for removing contaminants from wastewater, including reducing phosphorous-containing compounds, total suspended solids (TSS), biological oxygen demand (BOD), fats, oils, and greases (FOG), and total Kjedahl nitrogen (TKN) are described. Methods and compositions to control pH, sulfur and sodium loads present in wastewater and precipitatable solids are described. Concentrations of aluminum, magnesium, and calcium-based additives are maintained at mass action concentrations to the wastewater component levels present in the wastewater and bracketed approximately +/−0.5 pH units about the pK value of the soluble, buffering species.

15 Claims, No Drawings

COMPOSITIONS AND METHODS FOR WASTEWATER TREATMENT

RELATED APPLICATIONS

This application incorporates by reference in its entirety and claims priority to U.S. Provisional Application Ser. No. 60/863,927 filed Nov. 1, 2006.

This application incorporates by reference in its entirety and claims priority to U.S. Provisional Application Ser. No. 60/863,299 filed Oct. 27, 2006.

This application incorporates by reference in its entirety and claims priority to U.S. Provisional Application Ser. No. 60/779,002 filed Mar. 3, 2006.

FIELD OF THE INVENTION

Subject matter concerns compositions and methods for wastewater treatment.

BACKGROUND OF THE INVENTION

Domestic and industrial wastewater can be relatively rich in phosphorous, nitrogen, and carbonaceous contaminants that are essential nutrients for the growth of organisms. Phosphorus bans or limitations in synthetic detergents or changes in detergent formulas by the manufacturers have served to reduce the levels of phosphorous in domestic wastewater. However, many industrial and food process waste streams are inherently high in phosphorous content. One such example of high phosphorous content is the wastewater produced from a potato processing facility. The discharge of a phosphorous-rich wastewater into a receiving stream may stimulate accelerated algal growth, which can result in oxygen depletion and stream eutrophication.

Phosphorous is most efficiently removed from wastewater when it is in the form of orthophosphate ($H_2PO_4^-$, $HPO_4^{2-}$, or $PO_4^{3-}$), as many orthophosphate salts are not soluble in water. Although organic phosphonates and condensed phosphates can be readily converted into orthophosphate by treating them with strong, hot oxidizing acid conditions, this is not practical on a million gallon per day scale of wastewater treatment. Fortunately, many microbiological processes perform the conversion of the organic and condensed phosphates to orthophosphate.

Traditional methods to remove solids, such as settling, filtration, and centrifuging, will remove the great majority of all insoluble phosphorous species with the solid fraction. Removal of the remaining soluble phosphorous species, which is the focus of this invention, has been performed using the following methods: removal by phosphate-accumulating microorganisms; precipitation by a metal ion; and precipitation as struvite.

Soluble phosphorous can be removed by aerobic or facultative microorganisms that can incorporate the phosphorus into their cell mass. Once incorporated within the biomass, the phosphorous can be removed from the system as waste activated sludge.

Other common phosphorous removal methods involve the formation of insoluble phosphate salts with calcium, aluminum, or iron and allow the resulting particles to settle with the clarified sludge. Vanotti et al. (U.S. Pat. No. 6,893,567) describes a process for phosphorous removal that involves the use of lime (CaO, calcium oxide) under conditions of low nitrogen and carbonate alkalinity. Dissolution of lime in water produces calcium ions and a solution pH around 11. The calcium ions bond to the orthophosphate ions to form insoluble calcium hydroxyphosphate (hydroxyapatite) that settles to the bottom of the clarifier.

Aluminum hydroxyphosphate is formed from alum treatment of the orthophosphate containing wastewater. Alum (aluminum sulfate) reacts with water and orthophosphate to form the insoluble aluminum hydroxyphosphate. The pH for successful phosphate removal by alum treatment lies in a very narrow range around 6 and two molecules of alum are required for every one of phosphate removed. At pH below 5 or above 7, the removal of phosphate is either incomplete or a fine solid forms which has poor settling qualities.

Iron, in the form of ferrous or ferric salts, has been used to precipitate orthophosphate as the insoluble iron hydroxyphosphate. Soluble iron ions combine with alkalinity and phosphate to form the insoluble ferric hydroxyphosphate and the floc ferric hydroxide, which helps in the rate of settling. The ideal wastewater pH for this to occur is around 6. Most of the sludge from this removal is moved into an anaerobic digester. A very common iron salt for this purpose is ferric chloride.

The use of alum or ferric chloride for phosphorous removal has a significant drawback relating to the acidity of the coagulants that are being added to the wastewater. Since both aluminum sulfate and ferric chloride are acidic in nature, they will impart a decreased pH to both the settled solids and the overflow water. By decreasing the pH, microbial activity in the digester (aerobic or anaerobic) or in the secondary treatment process will be diminished.

Another method for phosphorous removal from wastewater involves the formation of struvite, an insoluble magnesium ammonium phosphate salt. Struvite formation in wastewater treatment plants is a relatively common, though unwanted, phenomenon, which can result in clogging wastewater pipes in areas of high flow velocity. Bowers et al. (U.S. Pat. No. 6,994,782) teach a method for the removal of phosphorous through the preferential precipitation and capture of struvite within a desired vessel that contains struvite seed crystals.

In many instances, neutralization is required for proper processing of wastewater. However, neutralization of acidic industrial wastewater can cause insoluble precipitation that under certain circumstance becomes problematic. For example, wastewater that contains a sufficient concentration of sulfur-containing chemicals using calcium containing pH-buffering agent, such as lime, will result in the formation of significant amounts of insoluble calcium sulfate particulates that can be captured in the settleable wastewater solids. The use of lime ($Ca(OH)_2$) for pH neutralization, upon dissolution of lime into calcium cations and hydroxide anions, creates calcium cations that form an insoluble precipitate with sulfate as described in the chemical equations below:

$$Ca(OH)_2 \rightarrow Ca^{2+} + 2OH^-$$

$$Ca^{2+} + SO_4^{2-} \rightarrow CaSO_4 \text{ (solid)}$$

The insolubility of calcium sulfate, coupled with the typical long holding time conditions during aeration, results in the formation of $CaSO_4$ particulates that become entrained within the growing matrix of activated sludge present within the secondary treatment process. In a typical secondary treatment process, after a certain amount of aeration time, the activated sludge is pumped into a quiescent zone called a secondary clarifier. In the secondary clarifier, the activated sludge (which is the microorganism biomass that has grown from the consumption of BOD contaminants) is allowed to settle to the bottom and the overflow stream from this clarifier is disinfected and discharged as the final effluent. The long aeration time coupled with the long clarifier settling time results in the accumulation of $CaSO_4$ mineral into the settled activated sludge in a secondary clarifier. A large percentage of the settled activated sludge is returned to the front end of the aeration process, ready to consume more BOD contaminants. This fraction of the activated sludge is called the Return Activated Sludge (RAS). A much smaller percentage of the settled activated sludge is discarded to waste and is thus called Waste Activated Sludge (WAS). The WAS may be mixed with the settled solids that were captured from the primary clarifier and this combined stream is dewatered using any number of standard wastewater dewatering devices, such as a centrifuge, belt press, or screw press. After dewatering, the solids are then sent to a furnace as an inexpensive form of fuel. The high $CaSO_4$ mineral content of the WAS is a significant contributor to the sulfur entering the furnace. Within the furnace, the extremely high temperature can cause the decomposition of $CaSO_4$ to lime and $SO_2$. Thus, the high $CaSO_4$ mineral content of the WAS is a significant contributor to the subsequent emissions of $SO_2$ from the furnace.

Subsequent use of the settled solids as fuel for a furnace will then result in the thermal breakdown of calcium sulfate and release of sulfur dioxide ($SO_2$) as a flu gas into the atmosphere. One such example of an acidic industrial wastewater that contains a sufficient concentration of sulfur-containing chemicals is the wastewater produced from a pulp mill that employs a sulfite pulping process. The flu gas discharge of sulfur dioxide into the atmosphere contributes to negative environmental factors such as acid rain and ozone layer depletion.

There are a number of known methods for $SO_2$ removal or "scrubbing" from flu gases, called flu gas desulphurization (FGD). However, none of the known $SO_2$ removal methods addresses the problem from the root cause, that being to minimize the precipitation and accumulation of sulfur-containing chemicals into the settled wastewater solids.

At a basic level of understanding, the wastewater treatment process involves three primary steps: 1) primary treatment, where settleable solids are removed from the waste stream, 2) secondary treatment, where soluble organic contaminants that did not settle in primary treatment are broken down by microorganisms into beneficial or benign small molecules, such as methane, carbon dioxide, nitrogen, and water, and 3) disinfection, where pathogenic microorganisms present in the final effluent are greatly minimized prior to discharge to a receiving body of water.

Wastewater having a low pH or insufficient alkalinity will not support the effective performance of microorganisms that are needed in the secondary treatment process to consume soluble organic contaminants from the wastewater stream. Typical parameters for measuring the concentration of soluble organic contaminants in a waste stream are biological oxygen demand (BOD) and chemical oxygen demand (COD). Various types of alkaline chemical additives have been employed for increasing the pH and alkalinity into the range where the microorganism population will provide optimum BOD and COD removal performance, typically within a pH range of 6.5 to 8, and more preferentially within the pH range of 7 to 7.5. Neutralization of wastewater is commonly and massively accomplished with sodium hydroxide solutions, a self-defeating process since the excess sodium contained in the treated water makes the treated water less suitable for crop irrigation purposes, and requires additional treatment to reduce sodium content in water.

In view of the foregoing, it is clear that there is a need for new compositions and methods for treating wastewater to remove phosphorous-containing wastewater contaminants.

There is also a need for new compositions and methods to reduce the precipitation and accumulation of sulfur-containing compounds into settled wastewater solids.

There is additionally a need for new compositions and methods to neutralize wastewater that does not employ sodium hydroxide neutralization procedures.

SUMMARY OF THE PARTICULAR EMBODIMENTS

The compositions and methods described herein treat wastewater such that sulfates are kept in soluble form to avoid incinerating sulfates that otherwise would be precipitated or entrapped in wastewater solids and avoid the formation of high sodium containing treated wastewaters that are not suitable for irrigation purposes.

Embodiments include compositions comprising and methods utilizing aluminum, magnesium, and calcium-based additives for wastewater treatment. Embodiments also include compositions comprising and methods for wastewater neutralization using single or multiple compositions of magnesium hydroxide, magnesium oxide, and potassium hydroxide.

DETAILED DESCRIPTION OF THE PARTICULAR EMBODIMENTS

In one embodiment, compositions for treating wastewater comprising at least one aluminum-based additive and at least one magnesium-based additive are provided so that the use of treatment with lime or Calcium oxide products is avoided. Wastewater sulfates are retained in water-soluble form as magnesium sulfate. The water solubility of magnesium sulfate is approximately 25.5 g/100 ml (20° C.), whereas the water solubility of calcium sulfate is approximately 0.04 g/100 ml (20° C.). Compositions and methods of using in the treatment of wastewater described below offer a potential 90% or greater reduction in sulfur dioxide emissions as the sulfate is kept in soluble form and accordingly away from precipitable solids that are later incinerated in a furnace. By transitioning sulfite-rich wastewater producers, as occurs in pulp mills that utilize lime (calcium oxide), to other non-calcium metal oxides or hydroxides as pH neutralizers, the sulfate in the wastewater will not be captured as an insoluble mineral salt. The sulfate remains in the aqueous phase and passes through the wastewater treatment process and into the receiving body of water. The settled wastewater solids contain far less sulfate, so that, upon incineration, far lower $SO_2$ emissions from flu gases are released into the environment.

In another embodiment, methods for treating wastewater to remove phosphorus-containing wastewater contaminants comprising treating the wastewater with a composition, which comprises at least one aluminum-based additive and at least one magnesium-based additive, are provided.

In an additional embodiment, compositions for treating wastewater that reduce the precipitation and accumulation of sulfur-containing solids in settled wastewater solids comprising magnesium oxide are provided.

In a further embodiment, methods for treating wastewater to reduce the precipitation and accumulation of sulfur-containing solids in settled wastewater solids comprising neutralizing the wastewater with magnesium oxide are provided.

In another embodiment, compositions for treating wastewater that reduce the amount of sodium in the treated wastewater comprising potassium hydroxide and either or both magnesium hydroxide and magnesium oxide are provided.

In a further embodiment, methods for treating wastewater to reduce the amount of sodium in the treated wastewater comprising treating the wastewater with a neutralizing agent, which comprises potassium hydroxide and either or both magnesium hydroxide and magnesium oxide, are provided.

Embodiments include compositions for treating wastewater to remove phosphorous-containing wastewater contaminants comprising at least one aluminum-based additive and at least one magnesium-based additive. Additional embodiments relate generally to compositions and methods for treating wastewater to remove other contaminants from the wastewater, including total suspended solids (TSS), biological oxygen demand (BOD), fats-oils-greases (FOG) and total Kjedahl nitrogen (TKN). Further embodiments include compositions and methods to control pH and sulfur loads present in wastewater and wastewater solids.

Other embodiments include compositions of aluminum, magnesium, calcium and/or potassium-based additives that are maintained at mass action concentrations to the water wastewater component levels present in the wastewater and bracketed approximately +/−0.5 pH units about a desired pK value. The desired pK value includes those values that promote preferred microbial activities to engage secondary wastewater treatment and sludge digestion processes, including those wastewaters having sulfur-containing chemicals.

Alternate embodiments include compositions having a pH range that is amenable to processing clarified wastewater and settled solids from treated wastewater. Magnesium additives useful in such compositions include, for example, magnesium hydroxide and magnesium oxide. Potassium additives useful in such compositions include, for example, potassium hydroxide. Other embodiments include any combination of magnesium hydroxide, magnesium oxide, and/or potassium hydroxide as alternatives to using sodium hydroxide as a neutralization agent to buffer the pH of acidic wastewater and to avoid increasing sodium contaminants in raw or incrementally treated wastewater, including raw and treated wastewater having sulfur-containing chemicals. Other magnesium hydroxide, magnesium oxide and/or potassium hydroxide composition embodiments include formulations balanced to buffer both highly alkaline or high pH wastewater solutions and highly acidic or low pH wastewater solutions. Alternate embodiments encompass chemical formulations that contain a mixture of soluble aluminum and magnesium ions that provide rapid settling properties and are amenable to sludge compaction.

A further embodiment includes replacement of lime (calcium oxide) with magnesium oxide (MgO) for pH neutralization of acidic wastewater that contains high levels of sulfate. Use of lime causes the formation of insoluble calcium sulfate ($CaSO_4$), whereas MgO will pH neutralize but will allow the sulfate to remain in the aqueous phase (since magnesium sulfate or Epsom Salt) is highly soluble. The lime-treated wastewater solids are dewatered and used as fuel for the boiler furnace. Since these solids contain a high level of $CaSO_4$, once in the furnace the $CaSO_4$ is decomposed to give off unacceptable levels of $SO_2$ emissions. The use of MgO provides pH neutralization of the acidic wastewater, but does not form an insoluble sulfate salt. Therefore, the $SO_4$ will remain in the aqueous phase of the wastewater stream and will pass out to the receiving body of water, and the settled solids that are dewatered and sent to the boiler furnace will contain much lower levels of sulfate, thus resulting in a significant reduction in $SO_2$ emissions.

Other embodiments relates generally to methods for pH neutralization of an acidic wastewater for the purpose of allowing the sulfur-containing chemicals to remain soluble within the wastewater and to be discharged into a receiving body of water. Other embodiments concern methods for aiding in the precipitation and entrapment of other contaminants into the wastewater settled solids, including total suspended solids (TSS), biological oxygen demand (BOD), fats-oils-greases (FOG), total Kjedahl nitrogen (TKN), ammonia, and phosphorous-containing compounds.

Alternate composition embodiments include chemical formulations that contain at least one magnesium-based additive and at least on aluminum-based additive that provide an increased pH and alkalinity in both the clarified wastewater and the settled solids, while allowing the sulfur-containing chemicals to remain soluble in the wastewater stream. In general, an increase in pH and/or alkalinity provides a preferred microbial activity for secondary treatment and sludge digestion processes.

Other embodiments described herein are directed generally to removing phosphorous and other wastewater contaminants (TSS, total suspended solids; BOD, biological oxygen demand; TKN, total Kjedahl nitrogen; etc.) from wastewater and more particularly to treating sewer lines or wastewater within a wastewater treatment plant to cause soluble forms of phosphorous to become insoluble and entrained within the solids fraction of the wastewater matrix for optimum removal efficiency.

One aspect of the embodiments provides a composition that contains at least one aluminum-based additive and at least one magnesium-based additive for treating wastewater traveling within a sewer line or wastewater flowing through an industrial or municipal wastewater treatment plant.

Application of a composition that contains at least one aluminum-based additive and at least one magnesium-based additive just prior to a primary or secondary clarifier provides phosphorous removal through the formation of insoluble magnesium and aluminum phosphate salts that settle out with the associated organic solids present.

By treating wastewater within a sewer line, orthophosphate and other soluble phosphorous species can be converted into an insoluble form well before the wastewater actually arrives at the wastewater treatment plant. The additional contact time afforded by upstream pretreatment the sewer line will prove beneficial for optimum phosphorous reduction. In addition, other benefits may be realized within a sewer line, such as odor and corrosion reduction of concrete lined pipe from the boost in pH and alkalinity provided by a high pH composition of this invention.

Another aspect of the embodiments describe the compositions in which the aluminum-based additive and magnesium-based additive are combined into a single alkaline formula containing: 1., at least one of the following aluminum-based additives: aluminum trihydroxide, hydrated alumina, partially hydrated alumina, sodium aluminate, potassium aluminate and alumina; and 2., at least one of the following magnesium-based additives: magnesium oxide or magnesium hydroxide.

By combining magnesium and aluminum into a single alkaline formulation, the benefits of each metal can be realized for optimum wastewater coagulation and alkalinity buffering. Aluminum cations ($Al^{3+}$) provide the primary coagulation benefit, through the formation of the insoluble, polymeric, web-like structure of aluminum hydroxide, and through the formation of insoluble aluminum hydroxyphosphate, which captures phosphorous within the solids fraction of the sludge. Magnesium ions ($Mg^{2+}$) aid in minimizing the resulting sludge volume by bonding to organic solids and causing them to settle without associated water molecules. By minimizing the amount of entrapped water in the sludge matrix, the volume of the sludge is minimized and the sludge density is maximized. This attribute of magnesium can result in a great reduction in the overall volume of sludge to be disposed from a wastewater treatment facility.

Exemplary compositions in which the aluminum-based additive and magnesium-based additive are combined into a single alkaline formula is a composition containing magnesium hydroxide ($Mg(OH)_2$) and either sodium aluminate or potassium aluminate. The addition of this composition into a wastewater having a pH less than 8 will result in the conversion of the aluminate ions ($Al_2O_4^{2-}$) into the insoluble, polymeric aluminum hydroxide, which provides the resulting coagulation and solids settling performance. The magnesium hydroxide in the formulation provides a strong buffering agent to fix the pH and alkalinity within a desired range for coagulation performance. In addition, the slow dissolution of $Mg(OH)_2$ provides $Mg^{2+}$ cations into the wastewater, which aid in reduction of the final sludge volume. Incorporation of aluminum oxide/hydroxide and potassium hydroxide into a formulated product with magnesium oxide/hydroxide or other non-calcium metals also avoids the formation of substantial insoluble sulfate minerals to avoid substantial $SO_2$ emission during incineration.

The ratio of the aluminum-based additive and magnesium-based additive in the composition is dependent upon the nature of the wastewater to be treated. When the primary goal of the treatment is rapid solids settling, the composition will contain more of the aluminum-based additive. Compositions that would provide rapid solid settling may be applied before a clarification step within the wastewater treatment process. When the primary goal of the treatment is solids compaction or pH neutralization, the composition will contain more of the magnesium-based additive. Compositions that would provide pH neutralization will be fed to a secondary treatment region within the wastewater treatment process. Compositions within the range of 1% aluminum-based additive to 99% magnesium-based additive through 99% aluminum-based additive to 1% magnesium-based additive have utility as wastewater treatment formulations within the scope of this embodiment. In order to simplify further discussions, the full range of these compositions is henceforth called "Al—Mg compositions".

A further aspect of the embodiments involves compositions in which the aluminum-based additive and magnesium-based additive are combined into a single alkaline formula that also contains potassium hydroxide. These compositions are necessary for optimum phosphorous reduction, solids settling, and sludge compaction performance to treat very acidic wastewater streams, such as that which is typically emitted from a metals finishing process or microelectronics cleaning process.

The ratio of the aluminum-based additive, the magnesium-based additive, and either sodium or potassium hydroxide in the composition is dependent upon the nature of the wastewater to be treated. When the wastewater to be treated is strongly acidic, the composition will contain more of the potassium hydroxide. When the wastewater to be treated is more mildly acidic, the composition will contain less potassium hydroxide (called "caustic"). Compositions within the range of 1% "Al—Mg composition" to 99% "caustic" through 99% "Al—Mg composition" to 1% "caustic" have utility as wastewater treatment formulations within the scope of this embodiment.

Compositions of the embodiments include those in which the aluminum-based additive and magnesium-based additive are combined into a single alkaline formula, which contains magnesium hydroxide, aluminum trihydroxide, and/or potassium hydroxide. Compositions may be varied to adjust the desired stability of the settling flocculant. For example, when aluminum-based and magnesium-based additives are combined into a single alkaline formula that contains magnesium hydroxide, aluminum trihydroxide, and potassium hydroxide, a more stable settling is conferred than those compositions containing sodium hydroxide. Moreover, when the aluminum-based additive and magnesium-based additive are combined into a single alkaline formula that contains magnesium hydroxide, aluminum trihydroxide, and potassium hydroxide, a more stable settling is conferred than slurries of magnesium hydroxide alone.

FORMULATION EXAMPLES

Exemplary compositions are described below in formula compositions A-F having KOH, $Mg(OH)_2$, and hydrated alumina components in water. The percentage values are approximate and refer to mass/mass (M/M) values or weight percentage. Generally, the solution formulations are made by first adding KOH to water either by adding solid KOH pellets to water, or as part of a 45% or other KOH concentrate to water, and allow any heat due to hydration cool to room temperature. Thereafter, solid $Mg(OH)_2$, having limited solubility in water, is added to the KOH solution, followed by alum in the form of Hydrol H-710. At this juncture, the components in solutions A-F are at slightly greater concentrations than those stated in solution formulations A-F below. Thereafter, water in sufficient quantities is added to obtain the KOH, $Mg(OH)_2$, and hydrated alumina components substantially near the stated concentrations below.

Magnesium hydroxide may be obtained from Inland Environmental Resources, Inc. (Spokane, Wash.). Hydrol H-710 is hydrated alumina and is available from Almatis (Bauxite, Ark.), and 45% KOH may be obtained from Northstar Chemicals (Sherwood, Oreg.). The KOH, $Mg(OH)_2$, and Hydro H-710 may be combined with water as described above to form the following A-F solution compositions:

Composition A:
4.3% $Mg(OH)_2$
42.8% Hydrol H-710
22.5% KOH
Remainder % water
Composition B:
16.7% $Mg(OH)_2$
33.3% Hydrol H-710
17.5% KOH
Remainder % water
Composition C:
26.1% $Mg(OH)_2$
26.1% Hydrol H-710
13.7% KOH
Remainder % water
Composition D:
36.4% $Mg(OH)_2$
18.2% Hydrol H-710
9.5% KOH
Remainder % water
Composition E:
46.6% $Mg(OH)_2$
10.3% Hydrol H-710
5.4% KOH
Remainder % water
Composition F:
52.8% $Mg(OH)_2$
5.6% Hydrol H-710
2.9% KOH
Remainder % water Alternatively, solid KOH pellets may be added to water to make the respective KOH solutions in compositions A-F. Alternate embodiments for the compositions above include those compositions formulated to reduce the precipitation and accumulation of sulfur-containing solids into settled wastewater solids in which the compositions A-F are supplemented with at least one additive containing lime, dolime, potash, and in some cases soda ash when treated water is not intended for irrigation purposes. Dolime is calcinized dolomite that includes approximately 60% CaO and approximately 40% MgO. Potash is a form of potassium carbonate and soda ash a form of sodium carbonate.

The formulations A-F above, and alternate embodiments having lime and/or dolime, may be made in which the formulations have the $Mg(OH)_2$ components exist as alkaline slurries of $Mg(OH)_2$ in the form of insoluble, suspended particles. The insoluble $Mg(OH)_2$ particles, when poured into an acetic wastewater stream, changes to a soluble form to release free $Mg^{2+}$ ions for association with wastewater laden sulfates, and two hydroxyl moieties to neutralize the pH or otherwise adjust the discharge pH of wastewater streams between 4 and 11. The compositions to produce the $Mg(OH)_2$ slurries are generally made in the descending order of the reagent list, that is, KOH is added after the $Mg(OH)_2$.

Alternate composition embodiments of the slurry-based formulations of compositions A-F may also include dispersants. The dispersants suitable may use any single or combination of polymeric anionic dispersants and salts thereof including homopolymers, copolymers and/or terpolymers having acid functionalities and any one or more monomers of maleic acid, maleic anhydride, acrylic acid, methacrylic acid, crotonic acid, itaconic acid, mesaconic acid, fumaric acid, vinylphosphonic acid, vinylsulfonic acid citraconic acid, vinylacetic acid, acryloxypropionic acid, vinylsulfonic acid, styrenesulfonic acid, 2-acrylamido-2-methylpropanesulfonic acid, allylsulfonic acid, allylphosphonic acid, vinylphosphonic acid, vinylsulfonic acid, acrylic acid and methacrylic acid.

Other alternate composition embodiments of the slurry-based formulations of compositions A-F may also include viscosity-modifying agents. The viscosity modifying agents suitable may use any single or combination of calcium oxide, calcium hydroxide, formic acid, acetic acid, propionic acid and butyric acid and the salts thereof. Other embodiments may include mannitol, mono-, di- and trisaccharides, including sucrose and lactose, and any manufacturing byproducts containing sugar-based organics substances as viscosity modifying agents. Other solution embodiments may include formic acid, acetic acid, propionic acid, butyric acid HCl, $HNO_3$, $HClO_4$, aluminum, ferric, magnesium, calcium and barium salts thereof as viscosity modifying agents. Yet other embodiments may include. calcium acetate, magnesium acetate and mixtures thereof as viscosity modifying agents.

Another alternate embodiment for compositions A-F above are made wherein the $Mg(OH)_2$ is predominantly exists in soluble or non-slurry form. In this case, the order of addition of components within the compositions A-F is altered in which the $Mg(OH)_2$ is added to KOH solutions, then brought up to volume with water.

Other aspects of the embodiments describe compositions in which the aluminum-based additive and magnesium-based additive are combined into a single acidic formula containing at least one of the following aluminum-based additives: aluminum sulfate, aluminum chloride, polyaluminum chloride, aluminum chlorohydrate, and aluminum nitrate; and at least one of the following magnesium-based additives: magnesium chloride, magnesium sulfate, magnesium nitrate, and magnesium acetate.

Acidic compositions within the scope of this invention provide a means to effectively neutralize high pH wastewater streams into an acceptable pH range for discharge, typically between 6 and 9, and depending on the wastewater treating authority, the discharge pH may be between 4 and 11. When the pH of the wastewater stream has been lowered into the neutral range, the aluminum-based additive and magnesium-based additive will provide the phosphorous removal, coagulation, settling, and solids compaction benefits described previously.

The alkaline formulations describes in compositions A-F may be inter blended between each other and/or combined with other metal hydroxides and metal carbonates to serve as custom-made neutralizers that may be formulated on-site to provide tailored treatments to diverse industrial and municipal wastewater treatment facilities. These compositions may be in multiple containers having multiple raw materials for re-formulation to meet the specific wastewater treatment requirements of a water discharge facility.

Thus, custom formulation blends may be readily prepared as needed depending on the historical needs of a given water discharge facility or new requirements determined from rapid testing procedures. For example, one water discharge facility may need a formulation containing Mg, Al, and K, another water discharge facility may need only Mg and K, and still another may need Mg, Al, Ca, and K.

Yet, other aspects of the embodiments involve compositions in which the aluminum-based additive and magnesium-based additive are combined into a single acidic formula which also contains a strong acid. Strong acids that may be used in such formulations are hydrochloric acid, sulfuric acid, nitric acid, phosphoric acid, citric acid, acetic acid or any other strong acid or acid combination that provides a substantially similar acidic content as the aforementioned acids. The additional acidity provided by the strong acid enhances the pH neutralization rate of the composition. The following examples of the embodiments are presented:

Method Example 1

The tables below provide laboratory total phosphorous (Total P) results from numerous bench top experiments in the development of the compositions of this invention. Testing was performed using clarifier influent wastewater from a fried potato processing facility. In some cases, the wastewater pH was lowered prior to the addition of the compositions; in other cases, the wastewater pH was not adjusted prior to treatment with an inventive composition.

Various inventive compositions were added to 1.0 L clarifier influent wastewater samples at dosages ranging from 100 parts per million (ppm) to 1,000 ppm. The wastewater samples were obtained at a location in which no other coagulation or flocculation aids or any other chemistry was added to the water. This was done to minimize any confounding results from the testing. The treated 1.0 L wastewater samples were stirred vigorously for 30 seconds and then at a very slow stirring rate for 2 hours. At that point, the wastewater samples were collected in bottles for Total P and pH analysis, which was performed the following day within 24 hours. The initial pH of the blank (untreated) wastewater sample was 6.54. The pH of the Blank sample dropped to 5.26 after 24 hours, as shown in table 1:

TABLE 1

| Compositions | Total P (ppm) | pH |
|---|---|---|
| Blank | 32.0 | 5.26 |
| 1 | 7.70 | 5.92 |
| 2 | 11.2 | 5.86 |
| 3 | 11.3 | 6.00 |
| 4 | 7.18 | 6.01 |
| 5 | 10.6 | 5.78 |
| 6 | 13.4 | 5.66 |
| 7 | 5.95 | 5.83 |
| 8 | 17.7 | 5.56 |
| 9 | 11.7 | 5.67 |

Table 2 provides data from the testing of a single inventive composition at increasing dosages ranging from 50 ppm to 400 ppm. Note that the best performance for both Total P reduction and TSS reduction was at a dose of 200 ppm. The initial pH of the Blank (untreated) wastewater sample was 6.67. This pH dropped to 5.10 after 24 hours, as shown in table 2.

TABLE 2

| Composition | Total P (ppm) | TSS (ppm) | pH |
|---|---|---|---|
| Blank | 31.2 | 1470 | 5.10 |
| 50 | 19.2 | 129 | 5.46 |
| 100 | 10.2 | 111 | 5.73 |
| 200 | 4.4 | 93 | 6.14 |
| 300 | 8.5 | 479 | 6.51 |
| 400 | 11.6 | 850 | 6.92 |

Table 3 provides data from the testing of two inventive compositions, 1 and 2, at increasing dosages ranging from 250 ppm to 750 ppm. In this case, the best performance for Total P reduction was observed at the highest dosages of each composition.

TABLE 3

| Compositions | Total P (ppm) | pH |
|---|---|---|
| Blank | 14.0 | 6.69* |
| 1A-250 | 12.4 | 7.34 |
| 1B-500 | 11.0 | 7.43 |
| 1C-750 | 7.93 | 7.56 |
| 2A-250 | 12.2 | 7.05 |
| 2B-500 | 8.86 | 7.12 |
| 2C-750 | 6.62 | 7.20 |

The asterisk (*) next to the pH of the Blank is meant to indicate that this reported pH was the exact initial pH of the Blank (untreated) wastewater sample at the time of testing, not after 24 hours. However, the pH values of the treated samples are those measured after 24 hours.

Method Example 2

With further regard to MgO and/or Mg(OH)$_2$ based processes, embodiments described herein are directed generally to adjusting the pH of acidic wastewater and more particularly to treating sewer lines or wastewater leading to or within a wastewater treatment plant to increase the pH into a range that is optimum for secondary treatment processes while allowing sulfur-containing chemicals to remain dissolved within the soluble phase of the wastewater stream, thus minimizing the resulting impact of sulfur dioxide emissions from use of wastewater solids as furnace fuel. In cases when the incoming wastewater or in-plant wastewaters are alkaline, acidic compositions containing MgO, Mg(OH)$_2$ and/or aluminum-based solutions may be prepared to bring down the pH.

By treating acidic wastewater within a sewer line or directly into a wastewater treatment process, such as a primary clarifier, trickling filter, or aeration basin, with either MgO or Mg(OH)$_2$, the pH of the wastewater stream will be increased due to the dissolution of these insoluble magnesium chemicals to release magnesium cations and hydroxide ions.

$$MgO+H_2O \rightarrow Mg(OH)_2$$

$$Mg(OH)_2 \rightarrow Mg^{2+}+2OH^-$$

Due to the aeration that that is employed in secondary treatment wastewater processes, the most abundant form of sulfur-containing contaminant in a wastewater stream is the sulfate anion ($SO_4^{2-}$). Magnesium cations form a soluble ion-pair complex with sulfate.

$$Mg^{2+}+SO_4^{2-} \rightarrow [Mg^{2+}-SO_4^{2-}] \text{ (soluble ion-pair)}.$$

Method Example 3

For formulations A-F, effective quantities are added to achieve and optimal buffering range that is bracketed approximately +/−0.5 pH units about the pK value of the A-F formulation. Working concentration ranges of the A-F formulations vary in incremental ranges of, and not limited to 0.001, 0.01, 0.1, 0.2, 0.5, and 1 normal depending on the concentration of waste components requiring treatment or neutralization present in the wastewater. Alternatively, formulations A-F may be added continuously to that concentration that effectively attains a wastewater pH within approximately +/−0.5 pH units about the pK value of a chosen A-F formulation.

While various embodiments of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

We claim:

1. A composition for treating wastewater comprising:
   water;
   an effective amount of potassium hydroxide added to the water to form a potassium hydroxide solution;
   an effective amount of a magnesium additive added to the potassium hydroxide solution, wherein the magnesium additive includes at least one of magnesium oxide and magnesium hydroxide, and
   an effective amount of an aluminum additive added to the potassium hydroxide solution having the magnesium additive, wherein the aluminum additive includes at least one of aluminum trihydroxide, potassium aluminate, and sodium aluminate,
   wherein the effective amounts are combined to form a composition comprising an alkaline formula capable of being added to the wastewater to control at least one of pH, solids settling, and solids compaction in the wastewater.

2. The composition of claim 1 wherein the effective amount of the alkaline formula is added to maintain the pH in the wastewater approximately between pH 4 and pH 11.

3. The composition of claim 1, wherein the magnesium additive includes magnesium hydroxide.

4. The composition of claim 1 wherein the aluminum additive includes aluminum trihydroxide.

5. The composition of claim 1, further comprising effective amounts of an alkali having at least one of calcium hydroxide, lime, hydrated lime, dolime, hydrated dolime, sodium hydroxide, potassium hydroxide, soda ash, and potash to maintain the wastewater pH within an approximate range between pH 4 and pH 11.

6. The composition of claim 1, wherein the composition is formulated in a form of at least one of a solid and a liquid.

7. The composition of claim 6, wherein the composition further includes a dispersant.

8. The composition of claim 7, wherein the dispersant includes at least one selected from the group consisting of maleic acid, maleic anhydride, acrylic acid, methacrylic acid, crotonic acid, itaconic acid, mesaconic acid, fumaric acid, vinylphosphonic acid, vinylsulfonic acid citraconic acid, vinylacetic acid, acryloxypropionic acid, vinylsulfonic acid, styrenesulfonic acid, 2-acrylamido-2-methylpropanesulfonic acid, allylsulfonic acid, allylphosphonic acid, vinylphosphonic acid, vinylsulfonic acid, acrylic acid, methacrylic acid, and salts thereof.

9. The composition of claim 6, wherein the composition is formulated in a form of a slurry including a viscosity-modifying agent.

10. The composition of claim 9, wherein the viscosity-modifying agent includes at least one selected from the group consisting of formic acid, acetic acid, propionic acid, butyric acid, $HCl$, $HNO_3$, $HClO_4$, and any aluminum, ferric, magnesium, and any calcium and barium salts thereof.

11. The composition of claim 9, wherein the viscosity-modifying agent includes at least one selected from the group consisting of mannitol, mono-, di- and trisaccharides, including sucrose and lactose, any manufacturing byproducts containing sugar-based organics substances, calcium oxide, and calcium hydroxide.

12. The composition of claim 6, wherein the composition further is formulated in a form of a slurry including a dispersant and a viscosity-modifying agent.

13. The composition of claim 1, wherein the alkaline formula further includes effective amounts of the composition added to the wastewater to control the sulfate solubility and phosphate precipitability in the wastewater.

14. A composition for treating wastewater comprising:
water;
an effective amount of a magnesium additive added to the water to form a magnesium slurry, wherein the magnesium additive includes at least one of magnesium oxide and magnesium hydroxide;
an effective amount of potassium hydroxide added to the magnesium slurry; and
an effective amount of an aluminum additive added to the magnesium slurry containing the potassium hydroxide, wherein the aluminum additive includes at least one of aluminum trihydroxide, potassium aluminate, and sodium aluminate;
wherein the effective amounts are combined to form a composition comprising an alkaline formula capable of being added to the wastewater to control at least one of pH, solids settling, and solids compaction in the wastewater.

15. A composition for treating wastewater comprising:
water;
effective amounts a magnesium additive added to the water to form a magnesium slurry, wherein the magnesium additive includes at least one of magnesium oxide and magnesium hydroxide;
an effective amount of potassium hydroxide added to the magnesium slurry;
an effective amount of an aluminum additive added to the magnesium slurry containing the potassium hydroxide, wherein the aluminum additive includes at least one of aluminum trihydroxide, potassium aluminate, and sodium aluminate; and
an effective amount of a calcium additive added to the magnesium slurry containing the potassium hydroxide and the aluminum additive,
wherein the effective amounts are combined to form a composition comprising an alkaline formula capable of being added to the wastewater to control at least one of pH, solids settling, and solids compaction in the wastewater.

* * * * *